United States Patent
Lavallee

(10) Patent No.: US 11,168,206 B2
(45) Date of Patent: Nov. 9, 2021

(54) ACRYLIC PROCESS AID FOR VINYL FOAM EXTRUSION

(71) Applicant: Arkema Inc., King of Prussia, PA (US)

(72) Inventor: Paul R. Lavallee, Berwyn, PA (US)

(73) Assignee: Arkema Inc., King of Prussia, PA (US)

(*) Notice: Subject to any disclaimer, the term of this patent is extended or adjusted under 35 U.S.C. 154(b) by 182 days.

(21) Appl. No.: 16/561,086

(22) Filed: Sep. 5, 2019

(65) Prior Publication Data

US 2019/0390050 A1    Dec. 26, 2019

Related U.S. Application Data

(63) Continuation of application No. 13/499,003, filed as application No. PCT/US2010/049899 on Sep. 23, 2010, now Pat. No. 10,442,926.

(60) Provisional application No. 61/247,022, filed on Sep. 30, 2009.

(51) Int. Cl.
*C08L 27/06*    (2006.01)
*C08L 27/24*    (2006.01)
*C08L 33/12*    (2006.01)

(52) U.S. Cl.
CPC ............... *C08L 27/06* (2013.01); *C08L 27/24* (2013.01); *C08L 33/12* (2013.01); *Y10T 428/249953* (2015.04)

(58) Field of Classification Search
None
See application file for complete search history.

(56) References Cited

U.S. PATENT DOCUMENTS

| | | |
|---|---|---|
| 4,370,286 A | 1/1983 | Nehmey et al. |
| 4,415,514 A | 11/1983 | Dorrestijn et al. .............. 264/53 |
| 4,588,776 A | 5/1986 | Bekker et al. |
| 6,348,512 B1 | 2/2002 | Adriani et al. |
| 6,391,976 B1 | 5/2002 | Naka et al. |
| 6,784,230 B1 | 8/2004 | Patterson et al. ............... 524/13 |
| 2001/0056150 A1 | 12/2001 | Smith ....................... C08F 2/24 |
| | | 524/458 |
| 2002/0045681 A1 | 4/2002 | Weier et al. ................... 523/201 |
| 2004/0077756 A1 | 4/2004 | Weier et al. |
| 2005/0192401 A1 | 9/2005 | Hauk ........................ C08F 2/44 |
| | | 524/732 |
| 2006/0194926 A1 | 8/2006 | Lee et al. |
| 2009/0093560 A1 | 4/2009 | Van Rheenen et al. |
| 2009/0111915 A1 | 4/2009 | Lavallee et al. |

*Primary Examiner* — Chinessa T. Golden
(74) *Attorney, Agent, or Firm* — Lynn B. Morreale

(57) ABSTRACT

The present invention relates to an acrylic process aid useful in vinyl foam extrusion. The process aid is an acrylic copolymer containing from 50 to 79 weight percent of methyl methacrylate monomer units and has a Tg of less than 90° C., preferably less than 70° C., and more preferably less than 65° C. PVC and CPVC foams containing this acrylic process aid fuse faster at the same temperature, or fuse in the same time at lower temperatures than foam formulations currently used.

7 Claims, No Drawings

ACRYLIC PROCESS AID FOR VINYL FOAM EXTRUSION

CROSS-REFERENCE TO RELATED APPLICATIONS

This application is a continuation of U.S. application Ser. No. 13/499,003, filed Mar. 29, 2012, which is a national stage application under 35 U.S.C. § 371 of PCT/US2010/049899, filed Sep. 23, 2010, which claims benefit to U.S. Provisional Application No. 61/247,022, filed on Sep. 30, 2009.

FIELD OF THE INVENTION

The present invention relates to an acrylic process aid useful in vinyl foam extrusion. The process aid is an acrylic copolymer containing from 50 to 79 weight percent of methyl methacrylate monomer units and has a Tg of less than 90° C., preferably less than 70° C., and more preferably less than 65° C. PVC and CPVC foams containing this acrylic process aid fuse faster at the same temperature, or fuse in the same time at lower temperatures than foam formulations currently used.

BACKGROUND OF THE INVENTION

Polyvinyl chloride (PVC) and chlorinated PVC (CPVC) can be foamed to provide lighter, less expensive articles. It is important that the PVC foams fuse quickly to allow for sufficient melt strength for foaming. PVC and CPVC foams can be developed via physical blowing agents or chemical blowing agents. Process aids are typically used to provide melt strength. Process aids can also facilitate the fusing process. Acrylic copolymer fusion aids that have at 80 weight percent and greater methylmethacrylate units have been used.

US 2009111915 by Applicant describes an improved acrylic copolymer for use in highly filled PVC flooring, pipe and siding. The copolymer has a lower MMA content, and a lower Tg than previously used acrylic copolymers There is a desire to produce PVC foams at lower operating temperatures. Lower operating temperatures save energy costs, improve product appearance, and also provide a safer working environment.

Applicant has surprisingly discovered that the use of an acrylic copolymer process aid with a lower level of methyl methacrylate monomer units than currently used can effectively used in PVC foam manufacture, providing the same level of fusion at lower temperatures, or a higher level of fusion at the same temperature, when compared to the acrylic copolymer process aids currently used having higher Tgs. A decreased processing temperature of up to 10° C., with the same level of fusion, have been seen using the improved acrylic copolymer of the invention. Further, lower operating temperatures allow for faster downstream cooling, offering potentially faster production speeds and improved product quality/appearance due to less heat history of the polymer.

SUMMARY OF THE INVENTION

The invention relates to a foamed material comprising:
a. 50 to 99 percent polyvinyl chloride (PVC) or chlorinated polyvinyl chloride (CPVC) foam matrix;
b. 1 to 15 weight percent of one or more acrylic copolymers, wherein said acrylic copolymer comprises from 50 to 79 weight percent of methyl methacrylate units, and from 20 to 50 weight percent comprising at least one other acrylic monomer, wherein said copolymer has a Tg of less than 90° C.;
c. 0 to 25 weight percent of filler; and
d. optionally other adjuvants;
the total adding to 100 weight percent.

DETAILED DESCRIPTION OF THE INVENTION

The invention relates to the use of an acrylic copolymer having a lower level of MMA units, and thus a lower Tg, as a processing aid for PVC and CPVC foam manufacture. The acrylic copolymer process aid provides for faster fusion at the same process temperature, or equivalent fusion at a lower process temperature.

Acrylic Copolymer

The process aid of the invention is an acrylic copolymer. By "acrylic" "copolymer", as used herein, includes copolymers, terpolymers and other polymers containing two or more different alkyl methacrylate and/or alkyl acrylate monomer units and mixtures thereof. The copolymers may be random, block, tapered, comb, star or other polymer architecture. The alkyl methacrylate monomer units are preferably methyl methacrylate (MMA), which may make up from 50 to 79 weight percent, more preferably from 50 to 75 weight percent, and even more preferably 50 to 70 weight percent of the monomer mixture. The remaining weight percent of the polymer, is composed of at least one other alkyl acrylate and/or alkyl methacrylate type of monomer units, and may also include other ethylenically unsaturated monomers. Other (non-acrylic) monomers useful in the copolymer composition include, but are not limited to, styrene, alpha methyl styrene, acrylonitrile, and crosslinkers may also be present in the monomer mixture. The Tg of the acrylic copolymer is less than 90° C., preferably less than 80° C., more preferably less than 70° C., even more preferably less than 65° C., and even less than 60° C. In addition to the methyl methacrylate monomer units, other methacrylate and acrylate monomers useful in the monomer mixture include, but are not limited to, methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers. Alkyl (meth) acrylic acids such as methyl acrylic acid and acrylic acid can be useful for the monomer mixture. A preferred acrylic copolymer is one formed from methyl methacrylate (MMA) and butyl acrylate (BA) monomer units. In the MMA/BA copolymer, the level of MMA is 79 weight percent or less, preferably 75 weight percent or less, and even more preferably 70 weight percent or less, and the level of BA monomer units is 21 weight percent or greater, preferably at least 25 weight percent or greater, and even more preferably 30 weight percent or greater.

The acrylic copolymer is present in the composite at a level of from 1 to 15 weight percent, preferably from 3 to 12 weight percent, and more preferably from 4 to 9 weight percent. The acrylic copolymer should be miscible with PVC and/or CPVC. The weight average molecular weight of the acrylic copolymer is in the range of from 2 million to 10 million, preferably from 3 million-8 million, and more preferably from 4.0 million to 7.0 million g/mol.

The acrylic copolymer is generally formed into a powder or granules for use in the PVC foam. The powder may be formed by typical means, such as spray drying, drum drying, freeze drying, vacuum drying, or coagulation by physical or chemical means. The acrylic copolymer may be supplied for use in manufacture in a convenient form, including but not limited to a powder, granules or pellets.

The polyvinyl chloride (PVC) or chlorinated polyvinyl chloride (CPVC) resin is of a particle size and molecular weight typically used for the manufacture of foam articles.

Blowing Agents

Blowing agents useful in the invention can be either chemical or physical blowing agents, or a mixture thereof. In the case of a chemical blowing agent, the gas is created by decomposition of a chemical heated above its degradation temperature. In the case of the physical blowing agent, gas is introduced into the polymer either directly or through evaporating a liquid foaming agent by heating it above its evaporation temperature. Chemical blowing agents are mainly used for higher density foams—down to 70% density reduction, while physical blowing agents can produce light foams—upwards of 10× density reduction.

The chemical blowing agent can be a solid or fluid. Useful blowing agents include, but are not limited to, azodicarbonamide, azodiisobutyronitile, sulfonylsemicarbazide, 4,4-oxybenzene, barium azodicarboxylate, 5-Phenyltetrazole, p-toluenesulfonylsemicarbazide, diisopropyl hydrazodicarboxylate, 4,4'-oxybis(benzenesulfonylhydrazide), diphenylsulfone-3,3'-disulfohydrazide, isatoic anhydride, N,N'-dimethyl-N,N'dinitroterephthalamide, citric acid/sodium bicarbonate, monosodium citrate/anhydrous citric acid, trihydrazinotriazine, N,N'-dinitroso-pentamethylenetetramine, and p-toluenesulfonylhydrazide. Mixtures of blowing agents are also contemplated by the invention.

Chemical blowing agents are typically either admixed as a powder with the PVC or CPVC composition in a mixer, or added at the extruder as pellets.

Filler and Other Additives

The PVC or CPVC composition may optionally include filler, and preferably contains from 1 to 25 percent of filler, and more preferably from 2 to 10 weight percent—based on the weight of the PVC. Typical fillers used in PVC and CPVC foams include, but are not limited to cellulosic fibers, calcium carbonate, rosin, limestone, aluminum trihydrate, quartz, and silica. The mean particle size of the filler is that typically used in a foam application. In general, the mean filler particle size is in the range of 0.07 to 100 microns, preferably from 0.5-3 microns, more preferable from 0.6-1.5 microns.

The PVC foam composition may also contain other adjuvants such as dyes, colorants, UV stabilizers, antioxidants, pigments, heat stabilizers, PVC homopolymer, process aids, plasticizers, lubricants, calcium stearate, metal release agents, polyethylene, paraffin wax, impact modifiers (especially in siding), $TiO_2$, and others as known in the art.

A nucleating agent is sometimes used to aid in foam formation.

The acrylic copolymer and other additives may be added directly to the PVC or CPVC composition, or may be pre-blended into a masterbatch to improve blending and manufacturing control.

The process for foam production using a chemical blowing agent is usually performed in an extruder. By "extruder" as used herein is meant a thermoforming device in which a homogeneous mixture of the polymer, blowing agent, and other additives exits as a foam. Useful extruders of the invention include, but are not limited to single and double screw extruders, blow molding devices, and injection molding devices. In the case of a single or double screw extruder producing a film, sheet, profile, tube, pipe, or rod, the process of extrusion and sizing is a continuous process. In blow molding and injection molding the process is non-continuous, and results in an article of a part for an article. The PVC, acrylic copolymer, filler and other additives are heated inside the extruder above its melting point in the presence of foaming and nucleating agents. When a chemical foaming agent is used, the temperature is raised above the decomposition temperature of the foaming agent, generating gas, which is then absorbed by the molten polymer under high pressure. Alternately, gas or fluid can be injected into the molten polymer. Gasses are excellent plasticizers for polymers.

Ideally, the polymer/gas mixture has sufficient melt strength and viscosity when it exits the die and is exposed to the atmospheric pressure. At this point, the gas dissolved in the polymer comes out of solution and generates gas cells in the polymer. These cells grow, until the gas in the polymer is depleted and the polymer is further cooled down, resisting further expansion. The foam expansion ceases once there is a balance between the gas pressure in the bubble and the extensional viscosity of the polymer melt. During this process, the foam is commonly sent through a sizer.

The lower Tg acrylic copolymer of the invention allows for the processing of PVC and CPVC foam at lower temperatures and/or faster fusion of PVC foam compounds at similar temperatures. For PVC and CPVC foam, fusion must first occur to ensure adequate melt strength to capture and contain the gas from the chemical or physical blowing agent. The timing of fusion is very important, as one must balance the fusion of the PVC or CPVC compound with the generation of gas from the degradation of the chemical blowing agent. The net effect is a wider processing window for the polymer matrix, allowing a wider variety of equipment and processing conditions to combine for good quality foam products. While increased processing temperatures can shorten fusion time, they also shorten the time to gas evolution from the chemical blowing agent. This invention offers the potential to fuse the PVC or CPVC compound faster at the same processing temperature, which will not materially affect the time to gas evolution from the chemical blowing Agent. The lower Tg of this process aid increases the entanglment of the PVC or CPVC resin, which allows for a better transfer of energy from the extruder to the formulation. This better transfer allows for a quicker fusion time at a given processing temperature. Additionally, the same effect can allow for similar fusion time at a lower processing temperature. It has been found that the acrylic copolymer of the invention can provide as much as a 10° C. cooler processing temperature for similar fusion profile. Cooler operating temperatures allow for quicker downstream cooling, which offer the benefit of potential faster production speeds, or improved product quality/appearance due to less heat history of the polymer. Additionally, it saves on energy costs/unit extruded.

The PVC or CPVC foam of the invention has good mechanical stability and load bearing properties. The foamed structure has a density that is at least 3% less than said non-foamed PVC, and more preferably at least 25% less. The density reduction could be 35% less, 50% less and even as high as 100 times less dense than the non-foamed PVC material. Another benefit of maintaining similar fusion while operating at lower temperatures is a decreased heat history of the polymeric foam melt. In many applications, the foam is cooled slowly and the long heat history of the slow cooling can lead to discoloration of the foamed article. The lower processing temperatures, however, aid in shortening the cooling time and thus improving the foamed articles color.

Preferably, the foam cell size is as small as possible. The cell size could be as small as 1 micron. Generally the cell size is in the range of from 10 to 250 microns, more typically in the range of from 50 to 150 microns.

An advantage of PVC foamed structures is their higher strength-to-weight ratio. Another advantage of the foamed structure of the invention is an increased impact resistance, increased hysteresis, reduced dielectric constant, and increased compressibility over non-foamed PVC. The foamed structures also provide increased insulation—both thermal and sound insulation to articles made from the foamed structure.

The foamed PVC structures of the invention could be used in the same applications as their solid counterparts. They would have the advantage of being lighter, saving shipping costs and making handling easier. Since the structures are lighter, they could find application where light weight is important, for example insulation panels, piping including foamed-core piping, trim pieces, and decking products.

EXAMPLES

A typical PVC foam formulation without blowing agent (see Addendum, Table 1), was blended using a common high-intensity mixer. The formulation was then tested in a torque rheometer, a standard industry tool. The torque rheometer test shows that fusion time of the polymer can be shortened at the same temperature. Repeating the test at lower temperatures shows that equivalent fusion times can be at a lower temperature. Table 2 shows the temperatures tested, while Table 3 shows the fusion times experienced. Further, a pair of match fusion points are shown in Table 4, displaying that processing conditions can be approximately 10° C. cooler.

It should be noted that testing showed that the new process aid does not increase fusion torque or equilibrium melt viscosity when tested at equivalent temperatures. However, as with most polymer systems processing at a lower temperature will result in increased fusion torque and melt viscosity.

TABLE 1

Formulation Used

|  |  | Add* | phr** | phr** |
|---|---|---|---|---|
| PVC Resin | K-57 resin | start | 100.00 | 100.00 |
| Tin-based Heat Stabilizer | Thermolite 161 | start | 2.50 | 2.50 |
| Lubricants | Calcium Stearate | 66 C. | 0.70 | 0.70 |
|  | Parrafin Wax | 66 C. | 1.00 | 1.00 |
|  | Oxidized Polyethylene Wax | 66 C. | 0.20 | 0.20 |
| High Molecular Weight Process Aid | Commercial Process Aid | 72 C. | 7.50 | — |
|  | Developmentatl Process Aid | 72 C. | — | 7.50 |
| Low Molecular Weight Process Aid | Plastistrength 770 | 72 C. | 2.00 | 2.00 |
| Filter | Treated Calcium Carbonate | 88 C. | 5.00 | 5.00 |
| Pigment | Titanium Dioxide | 98 C. | 4.00 | 4.00 |

*Addition Temperature to High Intensity mixer
**parts per hundred resin

TABLE 2

Design of Experiments for Torque Rheometer
Design of Experiments
Brabender Torque Rheometer: 65 g, 60 rpm

| Deg C. | Commerical Process Aid (nominally 80% MMA/20% BA) | Developmental Process Aid (nominally 70% MMA/30% BA) |
|---|---|---|
| 190 | X | X |
| 190 repeat |  | X |
| 185 |  | X |
| 180 | X | X |
| 180 repeat |  | X |
| 175 |  | X |
| 170 |  | X |
| 170 repeat |  | X |
| 165 |  | X |
| 160 |  | X |

TABLE 3

Fusion Time - Torque Rheometer
Fusion Time [min]
Brabender Torque Rheometer: 65 g, 60 rpm

| Deg C. | Commerical Process Aid (nominally 80% MMA/20% BA) | Developmental Process Aid (nominally 70% MMA/30% BA) |
|---|---|---|
| 190 | 0.90 | 0.70 |
| 190 repeat |  | 0.70 |
| 185 |  | 0.80 |
| 180 | 1.23 | 0.87 |
| 180 repeat |  | 0.93 |
| 175 |  | 1.07 |
| 170 |  | 1.20 |
| 170 repeat |  | 1.17 |
| 165 |  | 1.30 |
| 160 |  | 1.43 |

TABLE 4

Fusion Matches

| Match #1 - CPA @ 190 C. = DPA @ 180 C. = DPA @ 180 C. Repeat | | |
|---|---|---|
| 0.90 | 0.87 | 0.93 |
| Match #2 - CPA @ 180 C. = DPA @ 170 C. = DPA @ 170 C. Repeat | | |
| 1.23 | 1.20 | 1.17 |

What is claimed is:

1. A foamed material comprising:
   a. 50 to 99 percent polyvinyl chloride (PVC) or chlorinated polyvinyl chloride (CPVC) foam matrix;
   b. 1 to 15 weight percent of one or more acrylic copolymers process aids for forming PVC or CPVC foamed materials, said acrylic copolymer process aid having a configuration selected from the group consisting of random, block, tapered, comb, and star copolymers, wherein said acrylic copolymer process aid consists of from 50 to 75 weight percent of methyl methacrylate units, and from 25 to 50 weight percent consisting of at least one other different monomer selected from the group consisting of alkyl acrylate and styrene-monomer, wherein said acrylic copolymer process aid has a Tg of less than 90° C., a weight average molecular weight greater than 2 million g/mol, and is solid;
   c. filler selected from the group consisting of cellulosic fibers, calcium carbonate, rosin, limestone, aluminum trihydrate, quartz, and silica; and
   d. optionally other adjuvants selected from the group consisting of dyes, colorants, UV stabilizers, antioxidants, pigments, heat stabilizers, PVC homopolymer, acrylic process aids, plasticizers, lubricants, calcium stearate, metal release agents, polyethylene, paraffin wax, impact modifiers, and $TiO_2$;
   the total adding to 100 weight percent.

2. The foamed material of claim 1, wherein said acrylic copolymer consists of from 50 to 70 weight percent of methyl methacrylate units, and from 30 to 50 weight percent comprising at least one other acrylic monomer.

3. The foamed material of claim 1, comprising 3 to 12 weight percent of said acrylic copolymer.

4. The foamed material of claim 1, wherein said acrylic copolymer has a Tg of less than 80° C.

5. The foamed material of claim 1, comprising a sized article.

6. The foamed material of claim 1, having a foam cell size from 10 to 250 microns.

7. The foamed material of claim 1, wherein said acrylic copolymer is miscible with PVC and/or CPVC.

* * * * *